United States Patent [19]

Helmbold

[11] Patent Number: 4,520,862
[45] Date of Patent: Jun. 4, 1985

[54] ENERGY STORAGE APPARATUS

[76] Inventor: Walter Helmbold, Vor der Hurth 31, 5902 Unglinghausen, Fed. Rep. of Germany

[21] Appl. No.: 465,068

[22] Filed: Feb. 8, 1983

[30] Foreign Application Priority Data

Feb. 11, 1982 [DE] Fed. Rep. of Germany ....... 3204849
Mar. 20, 1982 [DE] Fed. Rep. of Germany ....... 3210370

[51] Int. Cl.$^3$ .............................................. F28D 17/02
[52] U.S. Cl. ..................................... 165/10; 165/135; 219/378; 219/472; 219/530; 219/531
[58] Field of Search ........................... 165/10, 135, 96; 219/472, 378, 530, 531

[56] References Cited

U.S. PATENT DOCUMENTS

| 2,083,732 | 6/1937 | Moore et al. | 219/472 |
| 3,381,113 | 4/1968 | Jacques et al. | 219/378 |
| 3,450,196 | 6/1969 | Bauer | 219/378 |
| 3,722,445 | 3/1973 | Karig et al. | 165/10 |
| 3,773,031 | 11/1973 | Laing et al. | 165/10 |
| 3,823,305 | 7/1974 | Schroder | 165/96 |

FOREIGN PATENT DOCUMENTS 604196  4/1978  U.S.S.R. ............................. 219/378

Primary Examiner—Albert W. Davis, Jr.
Attorney, Agent, or Firm—Sughrue, Mion, Zinn, Macpeak and Seas

[57] ABSTRACT

There is disclosed storage apparatus for storage of energy in the form of heat or cold, preferably over a prolonged storage period. The apparatus comprises a container enclosing an energy storage zone and an insulating zone around the storage zone. The storage zone is filled with a mass of heatable or coolable storage material forming a storage core, and the insulating zone with a porous mass of granular or fibrous material forming a thermal insulating layer. Energy can be supplied to the storage core by, for example, a solar-powered electrical resistance heater and extracted from the core at a desired time by, for example, a heat exchanger. The insulating effect of the insulating layer is enhanced, particularly from the viewpoint of long-term energy storage, by creation of a vacuum in the cellular structure of the insulating layer.

16 Claims, 6 Drawing Figures

ENERGY STORAGE APPARATUS

BACKGROUND OF THE INVENTION

The present invention relates to storage apparatus for the storage of energy in the form of heat or cold, preferably over a long storage period.

For the supply of the population with power and heat, it is expected that increasing use will be made of solar energy in the future, as direct utilization of solar energy is possible without environmental side effects. For this reason, use of the photo-voltaic solar cell is intensively investigated on a world-wide basis, as it permits sunlight to be directly converted into electricity at an efficiency up to a maximum of 25%.

Electrical current is a high grade form of energy. Amongst other things, current can be used to heat suitable storage masses to high temperatures. If consideration is taken of the fact that half the population of, for example, the Federal Republic of Germany lives in single-family or two-family houses of which the roofs, according to position and orientation, are radiated by solar energy equal to between four and five times the winter heating requirement of such houses, then it would clearly be advantageous to provide for heating of a store to a high temperature with solar cell current and to extract the heat from the store at times when heating is required. As solar energy radiation is at its highest in summer and the greatest requirement for heating occurs in winter, utilization of solar energy necessitates a durable long term heat store which can store the heat supplied in the summer without substantial heat loss before winter and which permits a simple form of heat extraction.

Stores are known for the storage of heat or cold with an external container, an electrically, chemically or thermally heatable or coolable storage mass and an insulating layer arranged between the external container and storage mass. Practice has shown, however, that a heat store of that kind with an insulating layer of natural or synthetic insulating material, for example polyurethane, is not capable of providing adequate insulation over longterm storage periods.

Double-walled liquid gas stores with a granularly porous insulating mass standing under vacuum in an insulating region formed between the double wall are known from a book by Gröbner, Erk and Grigull entitled "Grundgesetze der Wärmeübertragung" (Springer Verlag, Berlin, Göttingen, Heidelberg) 1963, page 137. However, such stores are intended only for small volumes or else they must be very thick-walled and thus very heavy.

It is accordingly one object of the invention to provide storage apparatus with enhanced thermal insulation so that losses from stored energy in the form of heat or cold are kept to a minimum, particularly over a prolonged storage period.

Another object of the invention is the provision of storage apparatus of uncomplicated and robust construction in which energy can be stored and from which the stored energy can be extracted in a simple manner.

Yet another object of the invention is to provide storage apparatus offering alternative possibilities of energy supply and energy extraction, including inter alia solar-sourced energy.

SUMMARY OF THE INVENTION

According to the invention there is provided storage apparatus for storage of energy in the form of heat or cold over a selectably prolonged storage period. The apparatus comprises container means which forms an external enclosure for an energy storage zone and for an insulating zone surrounding the storage zone. Present in the storage zone is a mass of heatable or coolable storage material, which forms an energy storage core, while present in the insulating zone is an insulating porous mass of granular or fibrous material, which provides an insulating layer between the storage core and the container means. Means are provided for heating or cooling the storage material to effect corresponding energy storage in the core and means are also provided for extraction of stored energy from the core. The insulating effect of the insulating layer is increased well above the insulating levels of known insulating arrangements by creation in the insulating zone, thus in the porous mass of granular or fibrous material, of a pressure below atmospheric pressure.

In the absence of any pressure barrier between the insulating and storage zones, the below-atmospheric pressure may also be created in the storage zone. Alternatively, a pressure barrier may be provided between the two zones to confine the below-atmospheric pressure to the insulating zone.

The container means may consist wholly or partially of an elastic or plastic material, which during the evacuation of the insulating layer transmits the external atmospheric pressure to the insulating mass so as to effect a pressure equalisation between the external pressure and the insulating mass. This measure may enable avoidance of any difficulties which might arise when the insulating layer of a container means of relatively large area is disposed under vacuum and must withstand the external pressure.

Other objects and advantages of the present invention will be apparent from the following detailed description of preferred embodiments and from the appended claims and drawings, which are described briefly hereinbelow:

BRIEF DESCRIPTION OF THE DRAWINGS

FIG. 1 shows heat storage apparatus comprising an external container 2, an insulating layer 3 and a storage core 4. The container 2 consists of prefabricated concrete parts and has high grade steel plates 21 at its inside wall surface, the steel plates 21 providing a vacuum-tight enclosure. Basalt chippings can be used as a storage mass in the storage core 4. The core 4 can be heated up by an electrical heating resistor 61, to which direct or alternating voltage can be applied by way of vacuum-tight current feeds 611 and 612. No separating wall is present between the storage mass of the core 4 and the insulating layer 3 in this embodiment, so that the entire storage content, thus of both the core 4 and the layer 3, can be evacuated through a vacuum pump 5.

Figure 1:
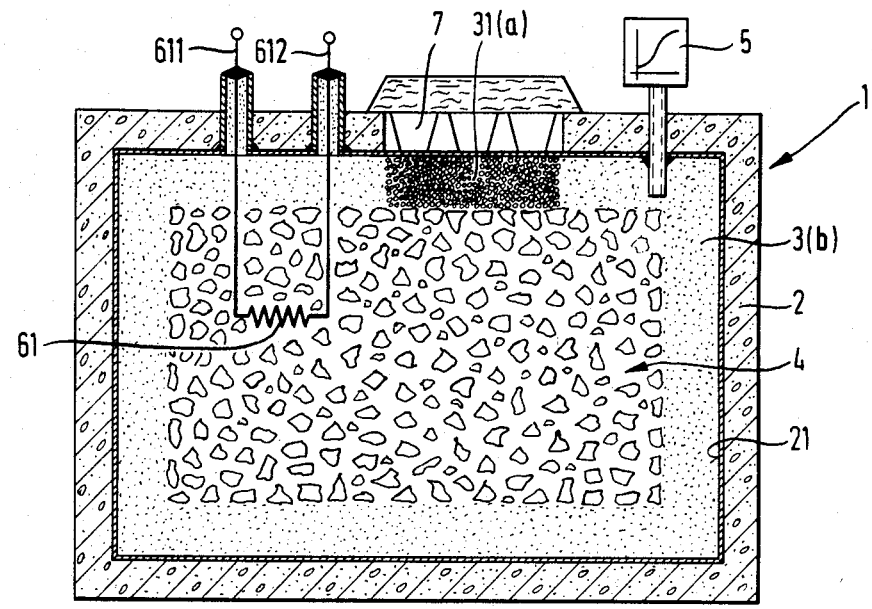
FIG. 1 is a schematic sectional view of energy storage apparatus according to a first embodiment of the invention, wherein energy extraction is by way of an areal heat exchanger.

When heat is stored in storage apparatus, losses occur as a function of the storage time. If it is assumed that a heat quantity $Q_o$ has been stored in the apparatus at the instant t=0 and that no intended extraction of heat therefrom has taken place, then the heat quantity Q (t) at the instant t can be represented approximately by the following equation:

$$Q(t) = Q_o e^{-t/\tau}$$

wherein:

$$\tau = (\rho c/\lambda) \cdot (V/A) \cdot d$$

wherein:

$\rho$ = density of the storage mass
c = specific heat of the storage mass
$\lambda$ = coefficient of thermal conductivity of the insulation
V = storage volume
A = storage surface
d = insulation layer thickness.

This equation applies under an assumption that the insulating layer thickness d is relatively small compared with the storage dimensions. If the store has the form of a cube with the volume $V=a^3$, then d must be much smaller than a. The factor ($\rho c/\lambda$) contains only constants of the storage and insulation material. The factor (v·d/A) characterises the geometry of the store. It follows from the equation $Q(t) = Q_o e^{-t/\tau}$ that when heat is to be stored over a long period, the time constant $\tau$ must be very great.

Conventional insulating substances have too high a coefficient of thermal conductivity $\lambda$, so that $\tau$ is too small. Although fine granular powders, for example pyrogenic silicic acid, have a coefficient of thermal conductivity of the desired order of magnitude, they are much too expensive for a large scale use.

Substantially lower coefficients of thermal conductivity can, however, be achieved through application of Smoluchowski effect. For this purpose, the insulating layer 3 in the storage apparatus 1 consists of particulate material in the form of a finely grained or fine fibrous mass. With this material, the proportion of point-to-point conduction, heat radiation and reciprocal effect between radiation and heat conduction in the fine fibrous or fine granular insulating mass is small. These proportions can be further reduced if the grains or fibres of the insulating mass are coated with an infrared reflecting material, for example, magnesium oxide. The known insulating mass "MINILEIT" ("MINILEIT" is a Trade Mark of the firm Grünzweig & Hartmann, Ludwigshafen, Federal Republic of Germany), contains an infrared reflecting powder.

If normal air pressure were to prevail in the insulating layer, then the afore-described proportions of point-to-point conduction, heat radiation and reciprocal effect between radiation and heat conduction are completely hidden by the heat conduction of the air. If, however, the air is removed from the insulating layer 3 by the vacuum pump 5, then the Smoluchowski effect applies. The thermal conductivity of the air disappears and the effective thermal conductivity $\lambda_{eff}$ of the insulating layer 2 then consists only of the conduction component provided by the point-to-point contact of the insulating grains or fibres in series, the radiation component and the reciprocal effect component between radiation and thermal conductivity of the grains or fibres of the insulating mass. With an insulating layer of that kind, the necessary coefficients of thermal conductivity of $\lambda \approx 0.003$ W/mK can be achieved for long term storage purposes. It is to be understood that the afore-mentioned heat transport components increase with increasing temperature of the storage core 4. The storage apparatus 1 with an insulating layer 3 providing Smoluchowski effect and with a suitable storage core 4 can be heated to high temperature by electrical resistance heating, by inductive or dielectric heating, or by use of heat exchangers, conducting heat generated by, for example, combustion.

In the case of the storage apparatus shown in FIG. 1, the storage core 4 may consist of vibrated basalt chippings, for which there applies:

$\rho = 2.35 \cdot 10^3$ kg/m$^3$
$c = 0.25 \cdot 10^{-3}$ kWh/KgK
$\lambda = 0.003$ W/mK
d = 0.5 m
V/A = 0.5 m From this, there follows a time constant $\tau$ of $\tau=48,958$ hours $\approx 5.5$ years.

Figure 2:
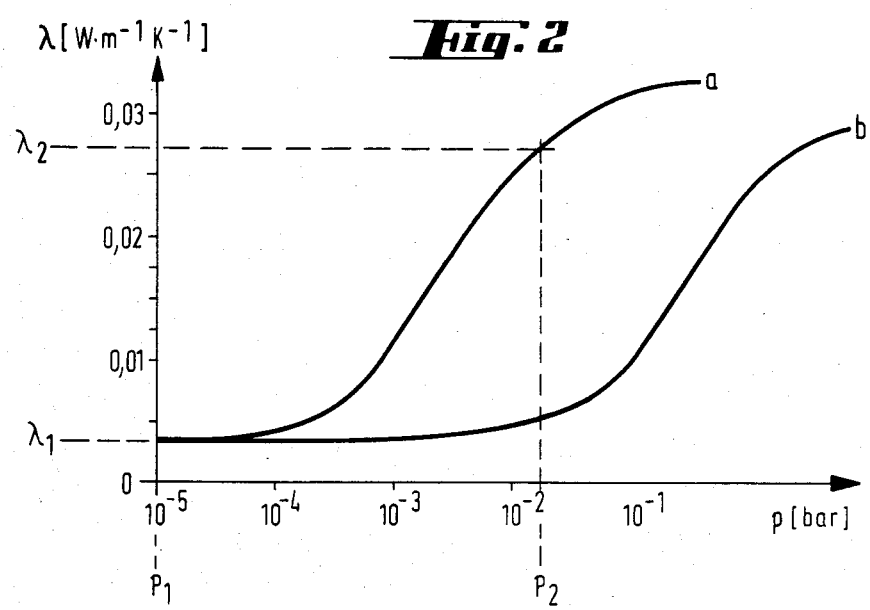
FIG. 2 is a diagram showing heat conductivity of coarse and fine granularly porous insulating substances as a function of a pressure insulating layer (Smoluchowski effect) in said energy storage apparatus.

For heat extraction from the storage apparatus 1, a heat exchanger 7 is provided in the wall of the container 2 in association with a part 31 of the insulating layer 3 containing an insulating mass a of coarse granulation, while an insulating mass b of fine granulation is normally present in the rest of the layer 3. The different granulation has the consequence that the mean free path length of the molecules of the residual air is significantly greater in the insulating mass a than in the finely granular insulating mass b. In FIG. 2, the thermal conductivity $\lambda$ of the two masses a and b is recorded as a function of the air pressure p in the insulating layer. Heat is stored in the apparatus with the insulating layer at the small pressure $p_1$, whereas heat is extracted from the apparatus at the pressure $p_2$. At the pressure $p_2$, the thermal conductivity of the normal finely granular insulating mass b is practically unchanged, while that of the coarsely granular insulating mass a is greatly increased. Therefore, a heat flow $$\dot{Q} = (\lambda_2/d) A_{WT} \Delta \theta$$

can be taken off in the region of the heat exchanger 7 at the external wall of the container 2, wherein the external wall of the container 2, wherein $A_{WT}$ = heat exchanger area Δθ = usable temperature difference
d = thickness of the coarsely granulated insulating material
λ2 = thermal conductivity of the coarse granulation after transition to the pressure $p_2$, see FIG. 2, while the remainder of the insulating layer continues to provide full insulation.

Figure 3:
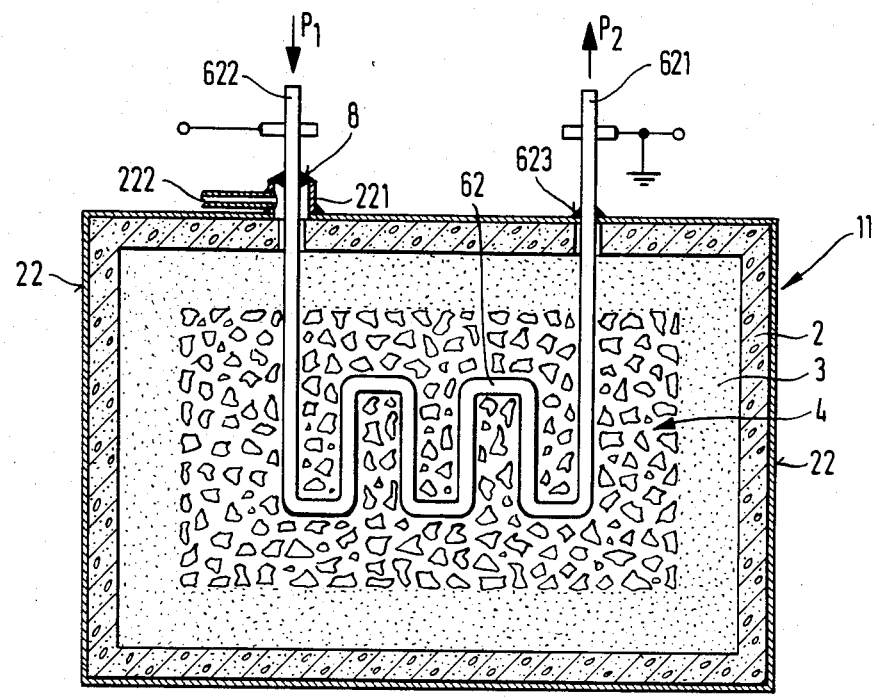
FIG. 3 is a schematic sectional view of energy storage apparatus according to a second embodiment of the invention, wherein energy extraction is by way of a tubular heat exchanger.

FIG. 3 shows storage apparatus 11 comprising a vacuumtight external skin 22, an insulating layer 3 and a storage core 4. By contrast to the apparatus 1 according to FIG. 1, the apparatus 11 is equipped with a tubular heating resistor 62. The tubular heating resistor 62 serves for electrical resistance heating during heat storage and as a heat exchanger during heat extraction. It is also possible to supply heat derived from, for example, combustion to the core 4 through the bore of the tubular heating resistor. This construction has the advantage that only two passages through the vacuum-tight external skin 22 are needed.

By means of this heating arrangement, topping-up of the stored heat for the winter heating period is possible after a summer of poor sunshine or after repairs. Thus, when the heat for storage is derived for solar energy, the solar cell area does not have to be dimensioned according to the energy input from the coldest summer, i.e. be overdimensioned. Electrical current is supplied to the resistor 62 by way of two feeds 621 and 622, the feed 621 being connected by a welding seam 623 directly with the external skin 22 and lying with this at ground potential. The other feed 622 of the heating element 62 extends through a stub pipe 221 connected to the external skin 22. An insulator 8 provides a seal and bearing for the feed 622 in the pipe 221. The pipe 221, which can if desired be cooled, has the effect that the insulator 8 is not thermally loaded. A vacuum pump is connected through a pipe 222 to the pipe 8 for evacuation of the insulating layer.

If heat is to be extracted from the storage apparatus 11, then this can take place through a heat carrier medium, preferably air at high storage temperatures, flowing through the bore of the resistor 62. The flow direction of the medium is indicated by the arrow $P_1$ and $P_2$. The relatively cool medium enters through the insulated feed 622 and the medium heated up in the storage core issues through the feed 621 at ground potential, so that the insulator 8 is loaded relatively lightly. For heating of the core 4 by combustion gases, the flow direction of the heating gases is of course opposite to that for heat extraction.

Figure 4:
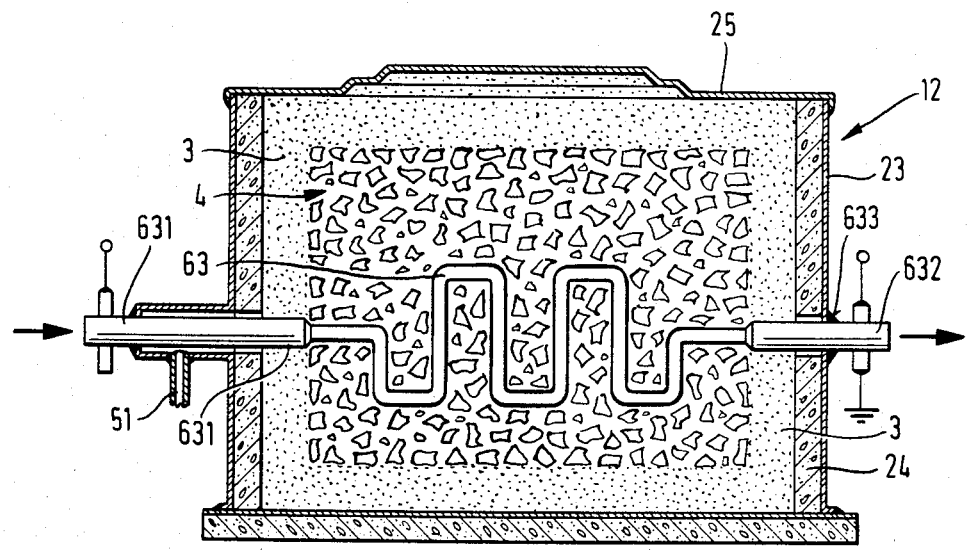
FIG. 4 is a schematic sectional view of energy storage apparatus according to a third embodiment of the invention, wherein energy extraction is by way of a tubular heat exchanger and pressure equalisation is provided at an insulating layer in the apparatus.

Storage apparatus 12 for high temperature heat storage is shown in FIG. 4. The apparatus 12 comprises a vacuumtight container 23, a concrete shell 24, an insulating layer 3 and a storage core 4. A weak point of large vacuum containers is that the container wall can be protected against implosion only with special measures. Although the apparatus 12 shown in FIG. 4 is not empty, a uniform distribution of the pressure stresses acting from outside cannot be presumed. For that reason, a part of the wall of the container 23 has the form of a resilient corrugated lid 25. It is, however, also possible to produce this part of the container wall from plastic material. If the container 23 is cylindrical, then the cylinder shell or a part thereof can be made from corruated metal plate or annular plate spring elements to provide a pressure equalisation zone. During evacuation, the cylinder shell compresses in the equalising zone like an accordion and in co-operation with the material mass of the insulating layer 3 produces a pressure equalisation in the apparatus 12. At the same time, expansion due to temperature can be absorbed.

The storage apparatus 12 is shown in FIG. 4 also comprises a heating element in the form of an electrical resistance heating tube 63, the feeds 631 and 632 of which are thickened so that any heat development is concentrated on the actual tube 63 in the interior of the storage core 4. The potential of the walls of the container 23 lies at earth. The tube 63 also serves as a heat exchanger for heat extraction, at which time the feed 632 is also applied to earth potential. In this manner, it is possible to utilise, in place of a thermally and electrically loaded vacuum passage, a simple welded connection 633. The feed 631 passes through the wall of the container 23 and shell 24 by way of a large diameter passage, which adjoins a stub pipe surrounding the feed 631 externally of the container 23 and connectible by way of a pipe 51 to a vacuum pipe for evacuating the insulating layer.

Figure 5:
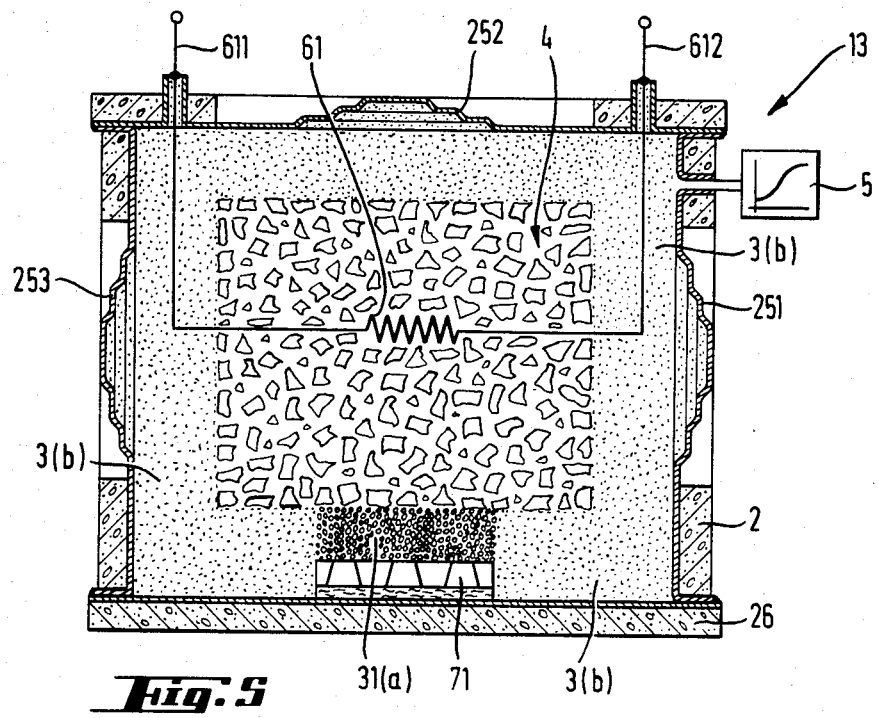
FIG. 5 is a schematic sectional view of energy storage apparatus according to a fourth embodiment of the invention, wherein energy extraction is by way of an areal heat exchanger and pressure equalisation is provided at an insulating layer in the apparatus.

A further embodiment of storage apparatus for high temperature heat storage and with pressure equalisation is shown in FIG. 5. The storage apparatus, referenced 13, consists of a storage core and an insulating layer 3 disposed in an external container 2, which basically consists of, for example, concrete and in part has resilient wall elements 251, 252 and 253 for pressure equalisation. A heating resistor 61 with electrical feeds 611 and 612 is again arranged in the interior of the storage core 4. The apparatus 13 stands on a base plate 26. As already described in connection with the apparatus 1 according to FIG. 1, heat extraction through the external skin is envisaged for the apparatus 13. For this purpose, a part 31 of the insulating mass is again of coarse granulation, so that in the case of a general and controlled reduction of the vacuum a heat flow takes place through the insulating layer part 31 to an areal exchanger 71. From there, the heat is conducted to consumer means, for example a domestic heating system. A vacuum pump 5 serves for evacuation of the interior of the container.

Figure 6:
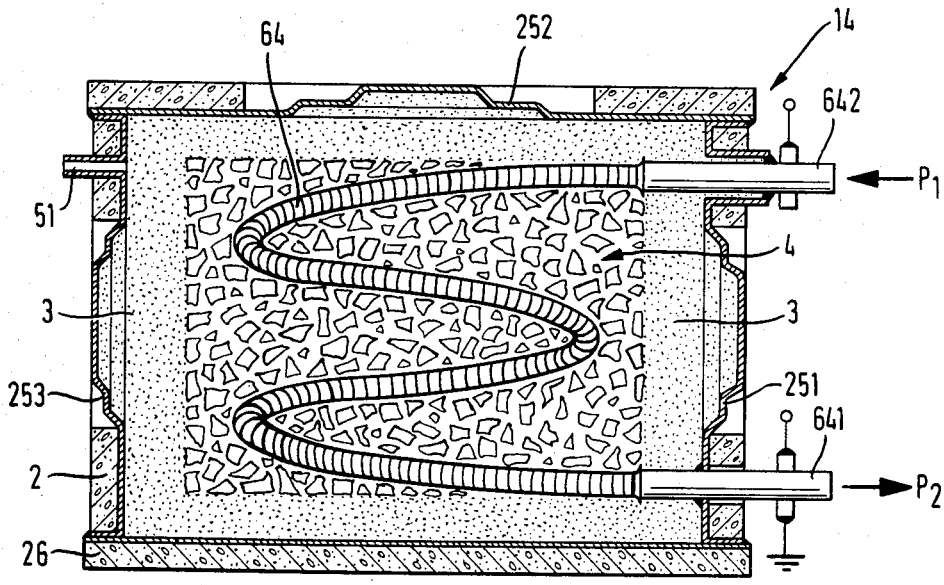
FIG. 6 is a schematic sectiona view of energy storage apparatus according to a fifth embodiment of the invention, wherein energy extraction is by way of a ribbed tube heat exchanger and pressure equalisation is provided at an insulating layer in the apparatus.

Storage apparatus 14 for high temperature heat storage and with pressure equalisation is shown in FIG. 6. The apparatus 14 consists of a storage core 4, an insulating layer 3 and an external container 2 of, for example, concrete with, in part, resilient wall elements 251, 252 and 253 for pressure equalisation. The apparatus 14 stands on a base plate 26. Heat storage in and heat extraction from the core 4 is provided by a resistance heating element 64 constructed as a ribbed tube to increase heat transference properties and ohmic resistance. The heat to be stored in the core 4 can either be generated electrically in the resistance heating element 64 or else it can be introduced through hot combustion gases in the bore of the element tube. The element 64 has two feeds 641 and 642, the construction of which and association with the external container 2 is exactly as described in connection with FIG. 3. The same applies also to the flow direction, represented by arrows $P_1$ and $P_2$, of a carrier medium through which the heat can be extracted from the storage core 4. Evacuation of the container interior can be effected by way of a stub pipe 51.

Embodiments of the invention have been described in the preceding by reference to five forms of storage apparatus each serving as a high temperature store. In this case, temperatures above 100° C. are regarded as "high temperature". All of the afore-described apparatus 11, 12, 13 and 14 have the constructional property that the storage core 4 and the insulating layer 3 stand under the same pressure and are not physically separated from each other.

It is also possible, however to construct storage apparatus with an insulating layer of the type described in such a manner that the insulating layer and the storage mass are separated from each other by an internal container (doubled-wall apparatus). Apparatus of that kind are suitable for all storage temperatures, thus heat or cold, and all known suitable kinds of storage media are usable. In these storage apparatus, the external or internal wall, or both, consists or consist wholly or partially of resilient elements which transmit the atmospheric pressure to the granularly porous insulating mass standing under vacuum in the insulating zone of the apparatus.

I claim:

1. Storage apparatus for storage of energy in the form of heat over a selectably prolonged storage period, said apparatus comprising:
   (a) container means forming an external enclosure for a heat storage zone and for an insulating zone which surrounds said storage zone and is in pressure communication therewith;
   (b) a porous mass of heatable storage material disposed in said storage zone within said container means to form a storage core for storage of heat energy;
   (c) means for subjecting said storage material in said storage zone to a heating process thereby to effect storage of heat energy in said storage core;
   (d) means for extraction of said stored heat energy from said storage core;
   (e) a thermal insulating layer disposed in said insulating zone between said storage core and inner wall means of said container means, said insulating layer comprising an insulating porous mass of granular or fibrous material; and
   (f) means for inducing in said storage zone and in said insulating zone within said container means a pressure below atmospheric pressure thereby to inhibit conduction of said stored heat energy from said storage core in direction through said insulating layer to said container means.

2. Storage apparatus for storage of energy in the form of heat over a selectably prolonged storage period, said apparatus comprising:
   (a) container means forming an external enclosure for a heat storage zone and for an insulating zone which surrounds said storage zone and is in pressure communication therewith;
   (b) a mass of granulate heatable storage material disposed in said storage zone within said container means to form a storage core for storage of heat energy;
   (c) means for subjecting said storage material in said storage zone to a heating process thereby to effect storage of heat energy in said storage core;
   (d) means for extraction of said stored heat energy from said storage core;
   (e) a thermal insulating layer disposed in said insulating zone between said storage core and inner wall means of said container means, said insulating layer comprising an insulating porous mass of granular or fibrous material; and
   (f) means for inducing in said storage zone and in said insulating zone within said container means a pressure below atmospheric pressure thereby to inhibit conduction of said stored heat energy from said storage core in direction through said insulating layer to said container means.

3. Storage apparatus according to claim 2, wherein said mass of heatable storage material is a porous mass of such material.

4. Storage apparatus according to claim 1, wherein said heatable storage material is a granulate material.

5. Storage apparatus according to claims 1 or 2, wherein said material of said insulating layer comprises granules or fibres coated with a material reflecting infrared radiation.

6. Storage apparatus according to claim 5, wherein said reflective material is magnesium oxide.

7. Storage apparatus according to claims 1 or 2, wherein said means for extraction of said stored heat energy comprises heat exchange means disposed in thermally conductive association with a portion of said insulating layer comprising granulate material having a grain size larger than that of the material of the remainder of said insulating layer and wherein said means for inducing in said storage zone and said insulating zone said pressure below atmospheric pressure is controllable to so vary said pressure below atmospheric pressure as to provide controlled conduction of heat from said storage core through said portion of said insulating layer to said heat exchange means.

8. Storage apparatus according to claims 1 or 2, wherein said means for subjecting said storage material to a heating process comprises electrical resistance heating means for heating said storage core.

9. Storage apparatus according to claim 8, wherein said electrical resistance heating means is constructed as pipe means extending in said container means and additionally serving for conduction through said container means of a fluid medium heated externally of said storage apparatus by combustion or heatable in said container means by said stored heat energy.

10. Storage apparatus according to claims 1 or 2, wherein said means for subjecting said storage material to a heating process comprises electrical resistance heating means for heating said storage core and heat exchange means arranged separately of said electrical resistance heating means for supply of further heat to said storage core.

11. Storage apparatus according to claims 1 or 2, wherein said means for subjecting said storage material to a heating process comprises electrical resistance heating means for heating said storage core and wherein said means for extraction of said stored heat energy comprises heat exchange means arranged separately of said electrical resistance means for extraction of heat from said storage core.

12. Storage apparatus according to claim 9, wherein said pipe means comprises tubular means provided with transversely ribbed corrugations.

13. Storage apparatus according to claim 8, comprising two electrical conduction means electrically connected to said electrical resistance heating means, both said conduction means extending through wall means of said container means and being in electrically insulated relationship to said wall means.

14. Storage apparatus according to claim 8, comprising two electrical conduction means electrically connected to said electrical resistance heating means, a first one of said conduction means extending through wall means of said container means and being in electrically insulated relationship to said wall means and the second one of said conduction means being in electrically conductive relationship to said wall means, wherein said second one of said conduction means is at a higher temperature than said first one of said conduction means.

15. Storage apparatus according to claims 1 or 2, wherein said means for subjecting said storage material to a heating process comprises window means for permitting the passage of infrared radiation to heat said storage core.

16. Storage apparatus according to claims 1 or 2, wherein said means for extraction of said stored heat energy comprises window means for permitting the passage of infrared radiation to extract heat from said storage core, and generating means operable by the extracted heat to generate electric current.

* * * * *